United States Patent [19]

Kobayashi

[11] 4,253,862

[45] Mar. 3, 1981

[54] DECORATIVE AIR BUBBLE FORMATION IN A GLASSWARE ARTICLE

[75] Inventor: Shigeru Kobayashi, Funabashi, Japan

[73] Assignee: Owens-Illinois, Inc., Toledo, Ohio

[21] Appl. No.: 48,574

[22] Filed: Jun. 14, 1979

[30] Foreign Application Priority Data

Jun. 19, 1978 [JP] Japan ............................. 53-73905

[51] Int. Cl.³ .............................................. C03B 7/08
[52] U.S. Cl. ........................................ 65/75; 65/132; 65/129; 65/330; 65/332; 65/22
[58] Field of Search ............... 65/22, 75, 126, 129, 65/132, 221, 330, 332

[56] References Cited

U.S. PATENT DOCUMENTS 1,592,299 7/1926 Howard .................................. 65/75
1,995,276 3/1935 Howard ............................. 65/221 X

FOREIGN PATENT DOCUMENTS 54-23613 2/1979 Japan.

Primary Examiner—William F. Smith
Attorney, Agent, or Firm—Harold F. Mensing; Myron E. Click; David H. Wilson, Jr.

[57] ABSTRACT

A glass article such as a sham bottom tumbler with decorative air bubble encapsulated in its base is produced on existing automatic glass-forming machines by injecting a bubble of air into a charge of molten glass in the gob-forming section of a glass furnace as the charge is being formed into a gob. This is accomplished by providing an air supply tube in the gob-forming plunger. Preferably, the lower tip of the tube extends below the lower tip of the plunger. Puffs of compressed air are supplied in synchronism with the plunger cycle so an air bubble is formed in the lower end of the gob, and the gob is then formed by normal procedures into a finished article.

2 Claims, 18 Drawing Figures

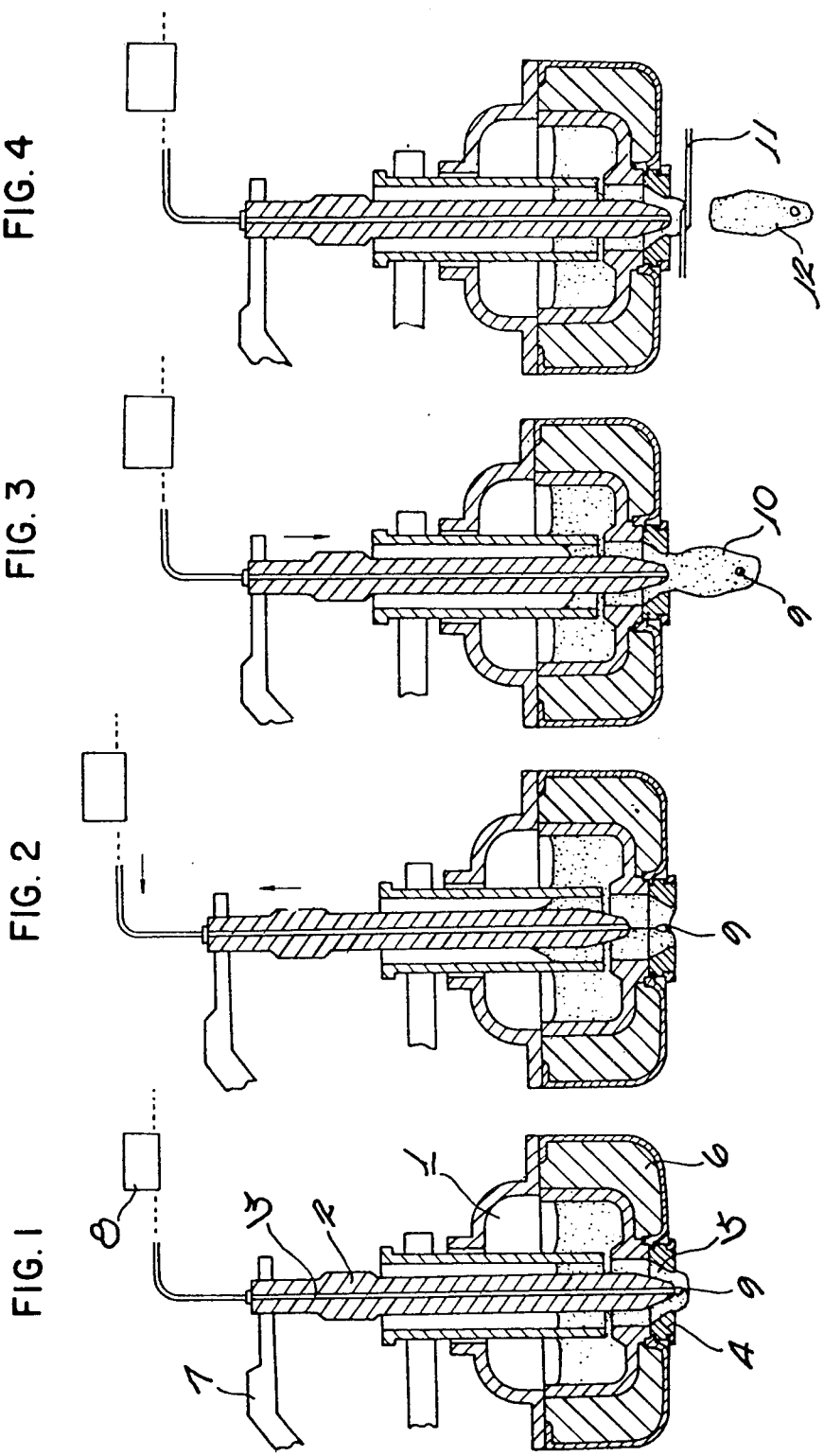

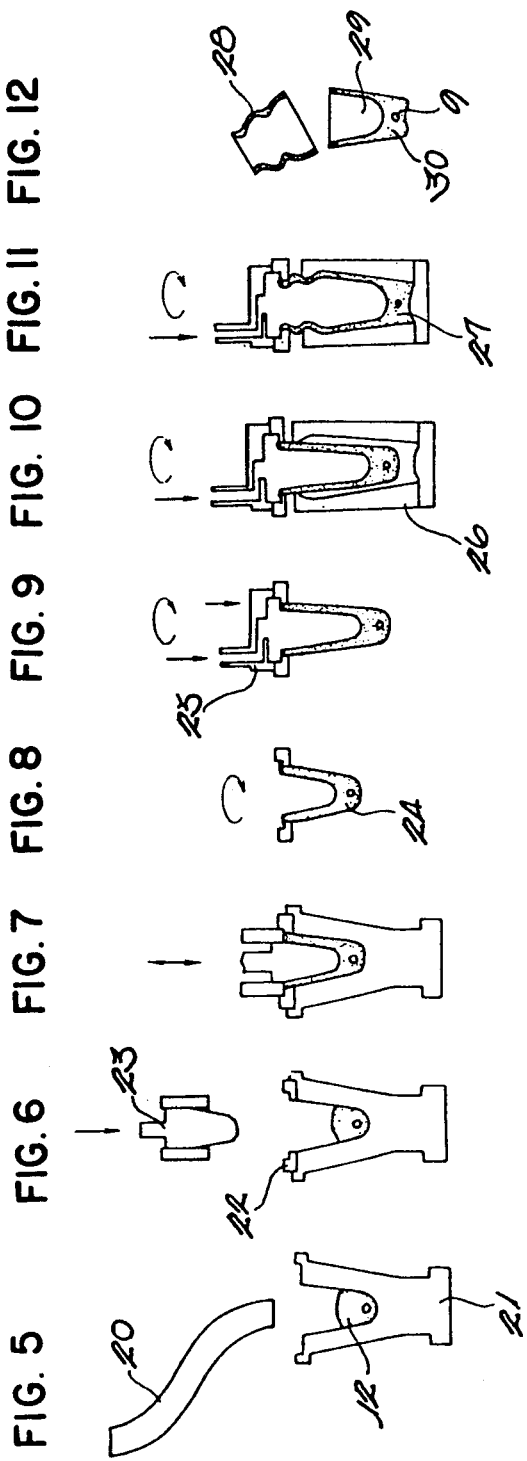

FIG. 13
FIG. 14
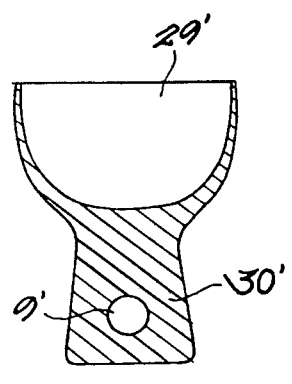
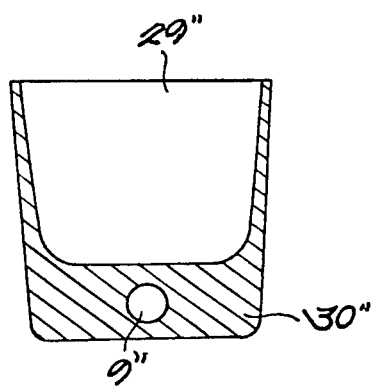
FIG. 15
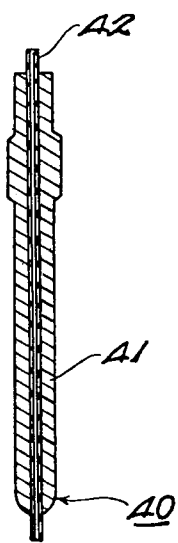

DECORATIVE AIR BUBBLE FORMATION IN A GLASSWARE ARTICLE

BACKGROUND OF THE INVENTION

This invention relates to a glassware manufacturing method in which an air bubble is shut in a thick part of the bottom of the glassware and also relates to a gob feeder to be used for carrying out this method.

To further the ornamentality of glasswares in addition to their ornamental shapes, there have been practiced various methods for forming voids within thick parts of them to utilize the refraction and reflection of glass by taking advantage of the transparency of glass. Of these methods, a method of enclosing air within a thick part of the bottom of a glassware to form an air bubble therein has long been practiced.

The conventional method of forming an air bubble within a thick part of the bottom of a glassware has been carried out by manually enclosing air in the thick part of the bottom during a process of forming the glassware. The conventional manual method has low production efficiency and also requires a high degree of skill.

It is an object of this invention to provide a glassware manufacturing method in which an air bubble is shut in a thick part of the bottom of the glassware by using either an automatic pressing machine such as a Lynch press machine or a machine called Hartford H-28 or an automatic press-and-blow molding machine.

It is another object of this invention to provide a plunger of a gob feeder which is to be used for carrying out the invented method.

SUMMARY OF THE INVENTION

This invention relates to a feeder which supplies a mass of a predetermined quantity of molten glass (hereinafter will be called a "gob") to a molding machine, a predetermined quantity of air is discharged with pressure out of the fore end of a plunger into the molten glass located within an orifice of the feeder in such a manner as to have an air bubble formed and shut within the molten glass; the predetermined quantity of the molten glass containing an air bubble is extracted and cut off by a shearing mechanism into a gob; and the gob is supplied to a molding machine to be formed into an air bubble containing glassware through a pressing or press-and-blow process.

The above and other objects and features of the invention will be apparent from the following description of embodiments thereof when read in connection with the accompanying drawings.

BRIEF DESCRIPTION OF THE DRAWINGS

FIGS. 1–4 are elevational cross-sectional views of a gob-forming apparatus showing four positions of the plunger during an air bubble injection cycle.

FIGS. 5–12 schematically show the progressive stages in the formation of a tumbler from a molten glass gob containing an air bubble.

FIGS. 13–14 are elevational cross-sectional views of two examples of tumblers produced by this invention.

FIG. 15 is an elevational cross-sectional view of an embodiment showing an air supply tube extending below the plunger tip.

DETAILED DESCRIPTION OF THE INVENTION

Figure 16:
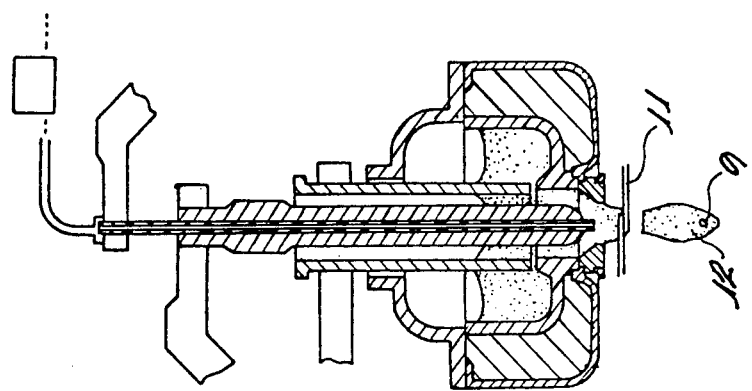
FIGS. 16–18 are views similar to FIGS. 1–4 but of an embodiment wherein the air tube remains stationary and only the surrounding plunger reciprocates.

Referring to FIGS. 1–4 of the drawings, there is shown a conventionally-known structural arrangement of a gob feeder 1 in which a plunger 2 vertically reciprocates to cause molten glass 5 to intermittently extrude out of an orifice 4, the plunger 2 is provided with an air supply passage 3 which pierces through the core part thereof in the axial direction.

The air supply passage 3 is provided for the purpose of discharging air with pressure from the tip of the plunger 2 into the molten glass 5. The rear end of the air supply passage 3 is connected by piping to a compressed air supply device 8 which supplies air in synchronism with the plunger 2. This embodiment of the invention employs a conventional press-and-blow molding machine (see FIGS. 5–12), the main body of which is not shown. The molding machine comprises a press-molding part which consists of a press mold 22 for forming parison 24 and a plunger 23 having a plunger ring and a blow molding part which consists of a blow mold 26 and a blow head 25 for rotating and blowing the parison 24.

The molding process of the embodiment is carried out by steps as follows: The molten glass 5 which has been melted by a melting furnace, which is not shown, is guided to the gob feeder 1 through a forehearth which is not shown.

First, a supporting arm 7 of a vertically reciprocating device which is not shown causes the plunger 2 to begin to ascend as shown in FIG. 1. Then, in synchronism with the start of the ascent of the plunger 2, the compressed air supply device 8 supplies a pre-set amount of air to the air supply passage 3 of the plunger 2 with a pre-set degree of pressure. The pressure air supply is discharged from the fore end of the air supply passage 3 into the molten glass 5 located within the orifice 4 to have the air thus enclosed therein in the form of an air bubble 9. The plunger 2 continues to ascend until it reaches an upper dead point as shown in FIG. 2, and then comes to descend. The descending plunger 2 extrudes a predetermined quantity of molten glass containing the air bubble 9 out of the orifice 4. When the descending plunger 2 reaches a lower dead point as shown in FIG. 3, a shearing mechanism 11 which works in synchronism with the movement of the plunger 2 comes to cut off the molten glass 5 to make it into a gob 12 which contains the air bubble 9 therein as shown in FIG. 4. The gob 12 then slides on a gob delivery member 20 down into the press mold 21 of the molding machine as shown in FIG. 5. The vertical position of the air bubble 9 enclosed within a thick part of the bottom of a glassware 29 is ultimately determined by the air discharging position of the fore end of the plunger 2. For determining this air bubble position, it is important that the synchronous action of the compressed air supply device 8 with the movement of the plunger 2 must be unvarying and that temperature distribution must be uniform covering the molten glass 5 within the orifice 4 and the inner surface of the press mold 21.

A neck ring mold 22 is fitted to the press mold 21 as shown in FIG. 6. Then, the plunger 21 which has a plunger ring comes into the press mold 21 to press and shape the gob 12 into a parison 24 as shown in FIG. 7. At this time, since the parison 24 is arranged to have a sufficiently thick part formed in the bottom thereof by a metal mold, the air bubble 9 which has been included in the gob 12 remains in the thick part in the bottom of the parison 24 (normally, the thickness of the air bubble enclosing part must be at least five times as much as the diameter of the air bubble 9). The parison 24 is taken out of the press mold 21 and is caused by the neck ring mold 22 to rotate on its axis in the direction of an arrow as shown in FIG. 8. While the parison 24 is thus rotated, a blow head 25 is put thereon to swell it by blowing as shown in FIG. 9.

The swollen parison 24 is transferred to the inside of a blow mold 26 as shown in FIG. 10 and is rotated and blown into a desired shape as shown in FIG. 11 to obtain a shaped product 27. Then, the shaped product 27 is taken out of the blow mold 26. An unnecessary portion 28 in the upper part of the shaped product 27 is cut off by a suitable method such as a burn-off method to finish it into a glassware 29 having an air bubble in the thick part 30 of the bottom portion thereof as shown in FIG. 12.

The present invention is applicable also to molding by a pressing process wherein the press mold 21 and the plunger 23 which are used in the pressing step of the above-stated embodiment example are designed to impart a desired ultimate shape to the product.

It goes without saying that glasswares of various shapes such as 29', 29'', (see FIGS. 13 and 14), etc., can be molded in accordance with this embodiment of the invention by varying the shapes of the press mold and the blow mold.

In a second embodiment shown in FIG. 15, the plunger 2 which is used in the preceding embodiment is replaced with a plunger 40 to carry out therewith the process of manufacturing a bubble containing glassware in the same manner as in the first-mentioned embodiment.

The plunger 40 is provided with an air supply hollow pipe 42 which is arranged to pierce through the core part of the body 41 of the plunger 40 in the axial direction thereof and to protrude out of the fore end of the plunger body 41 to a pre-set extent. In mounting the plunger 40 on the feeder 1, the protruding extent of the hollow pipe 42 from the fore end of the plunger body 41 is set in accordance with the desired vertical point at which the air bubble 9 is to be formed within a thick part 30 of the bottom of the glassware as prescribed by the design of the glassware 29. In other words, the protruding length of the air supply hollow pipe 42 is set longer in cases where an air bubble 9 is to be formed at an upper part within the thick part 30. Further, in some cases, the air supply pipe may be set to be not protrudent from the plunger body 41 at all and thus may be arranged into one unified body with the plunger 40. The plunger 40 is attached to a supporting arm 7 of the feeder 1 while the upper end of the hollow pipe 42 is connected to a piping arrangement coming from the compressed air supply device 8.

The molding process is carried out in the same manner as in the first embodiment to obtain the glassware 29.

In accordance with this embodiment example, it is possible to enclose and form the air bubble 9 at a point lower than the lower dead point of the plunger 2 arranged in first embodiment by adjusting the length of the hollow pipe 42 extending beyond the fore end of the plunger body 41, so that a greater latitude can be allowed by the arrangement of this embodiment in the selection of the vertical position of the air bubbles 9 to be shut in the thick part 30 in the bottom of the glassware 29.

Further, in the first embodiment, the plunger 2 is normally made of a heat-resisting brick, because the use of heat-resisting metal is too expensive. Therefore, the tip of the plunger 2 tends to be deformed due to fusion or breaking. Such deformation then causes the shape of the air bubble 9 to deviate from a desired shape and particularly sometimes results in sidewise deviation from a predetermined position. The possibility of this kind of trouble is eliminated in the second embodiment.

In a third embodiment (see FIGS. 16–18), the plunger 2 used in the first embodiment is replaced with a plunger 61. The plunger 61 is provided with a hollow pipe 62 which is made of a heat-resisting metal and is loosely fitted into a piercing hole provided in the core part of the plunger 61 in the axial direction thereof. The fore end of the pipe 62 is arranged to be fixed in a desired position within an orifice 4 independently of the plunger 61 and to discharge air with pressure therefrom into the molten glass 5 within the orifice 4. A glassware containing an air bubble is thus manufactured through the same procedures as those of the first embodiment.

The air supply pipe 62 is loosely fitted in the piercing hold of the plunger 61 which is attached to a support arm 7. After a vertical position of the fore end of the air supply pipe 62 within the orifice 4 is determined such that an air bubble 9 will be enclosed in a desired vertical position within a gob 12 and in the axial direction thereof, the air supply pipe 62 is secured to a fixed arm 63 independently of the plunger 61. This vertical position of the fore end of the air supply pipe 62 is, of course, arranged to be adjustable to some extent during a manufacturing operation.

The rear end of the air supply pipe 62 is connected to a compressed air supply device 8 through air piping.

Figure 17:
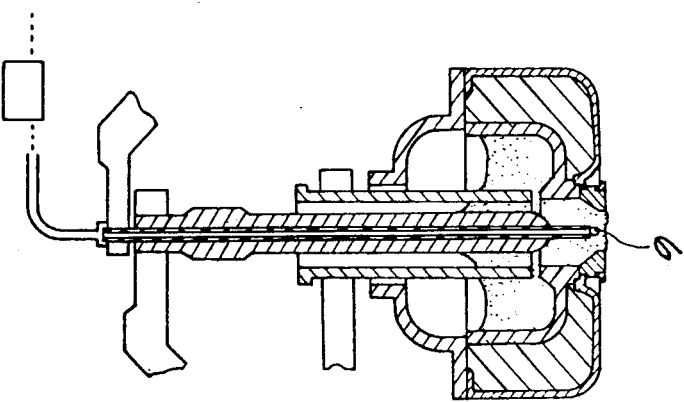
Figure 18:
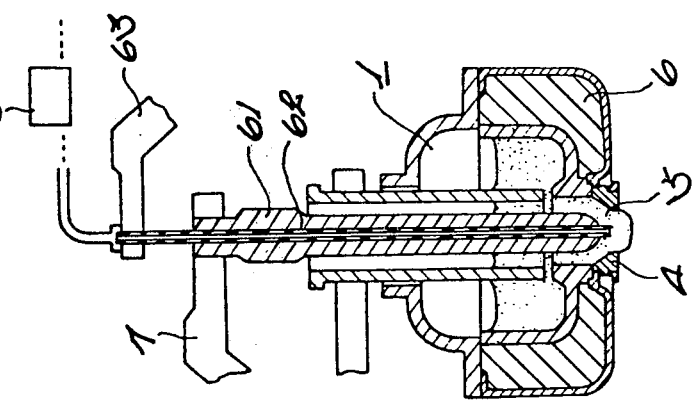

The molding process of this embodiment is carried out through the following steps: The plunger 61 begins to ascend from a lower dead point, as shown in FIG. 16, and reaches an upper dead point. In the meantime, the air supply pipe 62 remains stationary as it is fixed into the set position. The plunger begins to ascend. At this point of time, in synchronism with this motion of the plunger 61, the compressed air supply device 8 supplies a pre-set amount of air to the air supply pipe 62 with a pre-set degree of pressure. The pressure air is discharged out of the air supply pipe 62 into the molten glass 5 within the orifice 4 to form an air bubble 9 therein as shown in FIG. 17. The descending plunger 61 then comes to extrude a pre-set amount of the molten glass 5, which contains the air bubble 9 from the inside of the orifice 4 before it reaches the lower dead point. Then, a shearing mechanism 11 which works synchroneously with the plunger 61 cuts off the above-stated molten glass extruded out of the orifice into a gob 12 as shown in FIG. 18, and the gob 12 is supplied to a molding machine.

The rest of the process of manufacturing a glassware 29 is identical with that of the first embodiment.

In accordance with the third embodiment, the timing at which the pressure air is discharged out of the fore end of the air supply pipe 62 into the molten glass 5 can be set at the time of descent of the plunger 61. Therefore, the molten glass 5 is extruded out of the orifice 4 immediately after the air bubble 9 is enclosed in a desired position therein within the orifice 4. Compared with other embodiment Examples 1 and 2, the air bubble is allowed to stay within the orifice 4 for a shorter period of time. This arrangement ensures a stable operation for enclosing the air bubble 9 with a less possibility of having the air bubble 9 deviated from the predetermined position by the vertical movement of the plunger 61.

The embodiments given in the foregoing are to be selected according to the desired shapes and production quantity of glasswares. In accordance with each of these embodiment examples, a highly ornamental glassware product having an air bubble 9 enclosed within the thick part 30 of the bottom thereof can be manufactured in large quantity at low cost by an automatic molding machine, either through a press-molding process or through a press-and-blow molding process.

I claim:

1. A method for manufacturing a glassware article having a decorative bubble in a bottom wall section thereof, comprising the steps of vertically reciprocating a plunger of a gob feeder to intermittently extrude molten glass out of an orifice; forcing a predetermined amount of air from the fore end of said plunger into said molten glass within said orifice to make the molten glass contain an air bubble therein; extruding a bubble containing portion of said molten glass out of said orifice; shearing said extruded portion from the remaining molten glass to form a gob; introducing said severed gob into a forming mold and subsequently forming the bubble-containing gob into a glassware article having a decorative bubble encapsulated in the bottom wall thereof.

2. A method for manufacturing a glassware article according to claim 1, wherein said plunger has an air supply tube which is made of a heat-resisting metal and is slidably contained in an axial core hole of said plunger and the method steps further include the step of holding said pipe in a fixed position during reciprocation of said plunger.

* * * * *